(12) United States Patent
Andonian et al.

(10) Patent No.: US 6,681,881 B2
(45) Date of Patent: Jan. 27, 2004

(54) STEER-BY-WIRE SYSTEM WITH FIRST AND SECOND STEERING ACTUATORS

(75) Inventors: Brian J. Andonian, Livonia, MI (US); Bing Zheng, Dublin, OH (US); Gregory J. Stout, Ann Arbor, MI (US); Muqtada Husain, Brownstown, MI (US); Maged Radamis, Canton, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/928,841

(22) Filed: Aug. 13, 2001

(65) Prior Publication Data
US 2002/0070070 A1 Jun. 13, 2002

Related U.S. Application Data

(60) Provisional application No. 60/224,965, filed on Aug. 11, 2000, and provisional application No. 60/224,845, filed on Aug. 11, 2000.

(51) Int. Cl.⁷ .................................................. B62D 5/00
(52) U.S. Cl. .................... 180/402; 180/403; 180/421; 180/422; 701/41; 701/42
(58) Field of Search ....................... 180/402, 403, 180/421, 422, 443–446; 701/41, 42

(56) References Cited

U.S. PATENT DOCUMENTS

| | | | |
|---|---|---|---|
| 4,771,846 A | | 9/1988 | Venable et al. |
| 4,872,116 A | * | 10/1989 | Ito et al. .................... 701/41 |
| 4,922,427 A | * | 5/1990 | Yokote et al. ............... 701/48 |
| 5,097,917 A | | 3/1992 | Serizawa et al. |
| 5,123,497 A | * | 6/1992 | Yopp et al. ................ 180/422 |
| 5,653,304 A | * | 8/1997 | Renfroe .................... 180/402 |
| 5,908,457 A | | 6/1999 | Higashira et al. |
| 5,957,987 A | * | 9/1999 | Sudo et al. ................ 180/412 |
| 5,964,814 A | | 10/1999 | Müller et al. |
| 6,012,540 A | | 1/2000 | Bohner et al. |
| 6,032,757 A | | 3/2000 | Kawaguchi et al. |
| 6,041,882 A | | 3/2000 | Bohner et al. |
| 6,073,067 A | * | 6/2000 | Fujiwara et al. ........... 180/410 |
| 6,219,603 B1 | * | 4/2001 | Yamamoto et al. ......... 180/444 |
| 6,219,604 B1 | * | 4/2001 | Dilger et al. ............... 180/422 |
| 6,272,409 B1 | * | 8/2001 | Elwood ..................... 180/435 |
| 6,278,922 B1 | * | 8/2001 | Nishiwaki .................. 180/197 |
| 6,332,104 B1 | * | 12/2001 | Brown et al. .............. 180/282 |
| 6,334,502 B1 | * | 1/2002 | Tsujimoto ................. 180/446 |
| 6,343,671 B1 | * | 2/2002 | Ackermann et al. ....... 180/443 |
| 6,345,681 B1 | * | 2/2002 | Hackl et al. ............... 180/402 |
| 6,363,305 B1 | * | 3/2002 | Kaufmann et al. ......... 180/402 |
| 6,370,460 B1 | * | 4/2002 | Kaufmann et al. ......... 180/402 |
| 6,422,336 B1 | * | 7/2002 | Abele et al. ............... 180/446 |

FOREIGN PATENT DOCUMENTS

| | | |
|---|---|---|
| WO | WO 99/39967 | 8/1999 |
| WO | WO 99/58390 | 11/1999 |

* cited by examiner

*Primary Examiner*—Lesley D. Morris
*Assistant Examiner*—L. Lum
(74) *Attorney, Agent, or Firm*—Brinks Hofer Gilson & Lione

(57) ABSTRACT

A steer-by-wire system of the preferred embodiment of the invention includes a steering sensor, a turning subsystem, a vehicle sensor, and a controller subsystem. The turning subsystem further includes a first turning actuator to adjust a turning angle of a first road wheel, a first turning sensor to sense first turning factors of the first turning actuator, a second turning actuator to adjust a turning angle of a second road wheel, and a second turning sensor to sense second turning factors of the second turning actuator. The controller subsystem is connected to the steering sensor, to the first turning sensor, to the second turning sensor, and to the vehicle sensor. The control subsystem independently controls the first turning actuator and the second turning actuator.

13 Claims, 2 Drawing Sheets ated Applications

The present invention claims priority to U.S. Provisional Application Ser. No. 60/224,965, filed on Aug. 11, 2000 and to U.S. Provisional Application Ser. No. 60/224,845, filed on Aug. 11, 2000.

TECHNICAL FIELD OF THE INVENTION

The present invention generally relates to steer-by-wire systems and, more specifically, to steer-by-wire systems that include a first turning actuator and a second turning actuator.

BACKGROUND OF THE INVENTION

In conventional steering systems for a vehicle, such as manual or power steering systems, the steering wheel is mechanically coupled to the road wheels by a particular mechanism, such as a rack and pinion subsystem. Further, the road wheels are mechanically coupled to each other with this same particular mechanism. These systems have inherent shortcomings such as the complexity and weight of the mechanical coupling between the steering wheel and the road wheels, and between the road wheels. Although various steer-by-wire systems, which omit the mechanical coupling between the steering wheel and the road wheels, are known in the art, none of these systems specifically address the mechanical coupling between the road wheels. For those reasons, there is a need in the automotive art, if not other arts, for a steer-by-wire system that omits the mechanical coupling between the road wheels.

DETAILED DESCRIPTION OF THE PREFERRED EMBODIMENT AND METHOD

Figure 1:
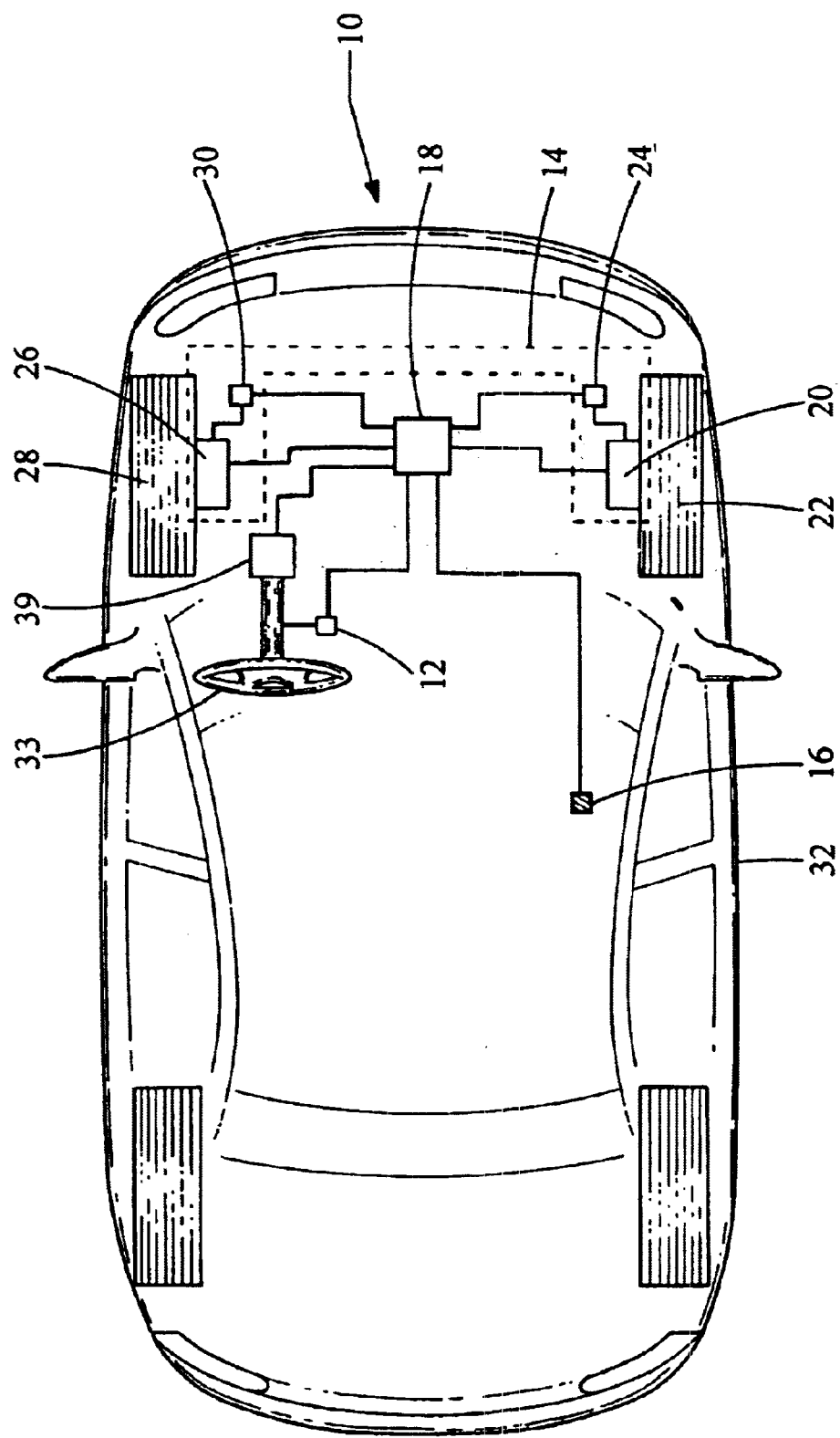
FIG. 1 is a schematic top view of the preferred embodiment of the invention.
Figure 2:
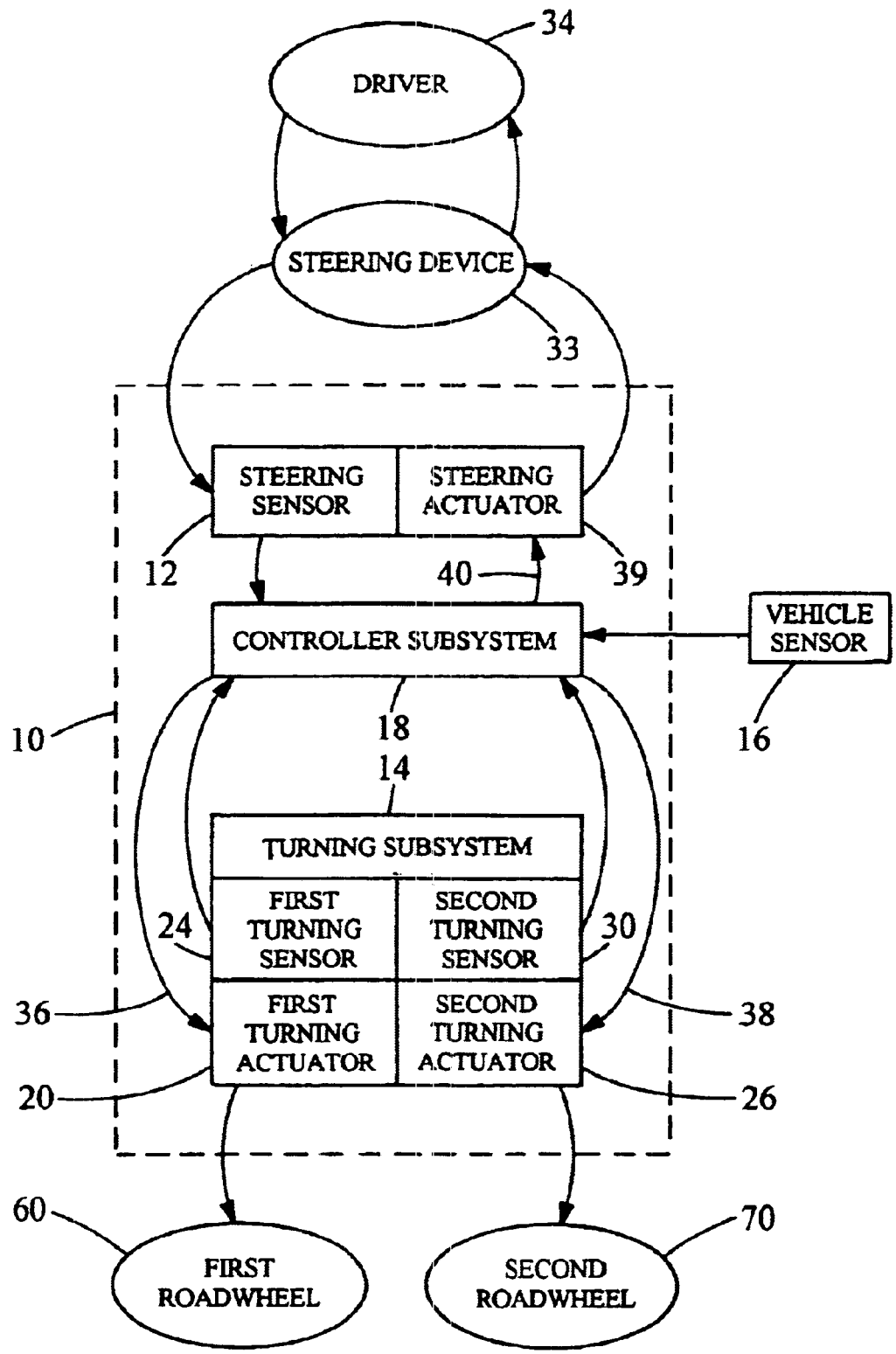
FIG. 2 is a schematic flow chart of the components and signals of the preferred method of the invention.

The following description of the preferred embodiment of the invention is not intended to limit the scope of the invention to this preferred embodiment, but rather to enable any person skilled in the arts of steer-by-wire to make and use the invention As shown in FIGS. 1 and 2, the steer-by-wire system 10 of the preferred embodiment of the invention includes a steering sensor 12, a turning subsystem 14, a vehicle sensor 16, and a controller subsystem 18. The turning subsystem 14 further includes a first turning actuator 20 to adjust a turning angle of a first road wheel 22, a first turning sensor 24 to sense first turning factors of the first turning actuator 20, a second turning actuator 26 to adjust a turning angle of a second road wheel 28, and a second turning sensor 30 to sense second turning factors of the second turning actuator 26. The controller subsystem 18 is connected to the steering sensor 12, to the first turning sensor 24, to the second turning sensor 30, and to the vehicle sensor 16. The control subsystem independently controls the first turning actuator 20 and the second turning actuator 26.

The steer-by-wire system 10 of the preferred embodiment of the invention has been specifically designed for a vehicle 32 (shown in FIG. 1) having a first road wheel 22 capable of turning, a second road wheel 28 capable of turning, and a steering device 33 capable of sensing a steering input from a driver 34 (shown in FIG. 2) of the vehicle 32. The steer-by-wire system 10, however, may be used in other suitable environments.

The steering sensor 12 of the steer-by-wire system 10, which functions to sense steering factors of the steering input, is preferably coupled to the steering device 33. The steering sensor 12 preferably includes a steering angle sensor and a steering torque sensor, which senses steering angle and a steering torque, respectively, of the steering input. The steering angle and the steering torque are preferred measurements that indicate the steering intent of the driver 34 of the vehicle 32. The steering factors, however, are only preferred when the steer-by-wire system 10 interacts with a rotating steering device, such as a typical steering wheel of a typical vehicle 32. When the steer-by-wire system 10 interacts with other steering devices, such as a joystick, a touch pad, or a track ball, the steering factors may include other suitable measurements and, consequently, the steering sensor 12 may include other suitable sensors. The steering angle sensor and the steering torque sensor are preferably conventional sensors, but may alternatively be any suitable devices that sense steering factors of the steering input.

The first turning actuator 20 and the second turning actuator 26 of the turning subsystem 14, which function to independently adjust the turning angle of the first road wheel 22 and the second road wheel 28, are preferably mounted to the vehicle 32. Preferably, the first turning actuator 20 and the second turning actuator 26 are separate conventional electrical power-assisted steering devices connected to the first road wheel and to the second road wheel 28 through conventional electric motors and conventional rack and pinion subsystems. Alternatively, any suitable devices capable of independently turning the first road wheel 22 and the second road wheel 28 may be used. The first turning actuator 20 and the second turning actuator 26 are further adapted to receive a first turning control signal 36 (shown in FIG. 2) and a second turning control signal 38 (shown in FIG. 2), respectively, from the controller subsystem 18, as discussed below.

The first turning sensor 24 of the turning subsystem 14, which functions to sense first turning factors of the first turning actuator 20, is preferably coupled to the first turning actuator 20. Likewise, the second turning sensor 30 of the turning subsystem 14, which functions to sense second turning factors of the second turning actuator 26, is preferably coupled to the second turning actuator 26. The first turning sensor 24 preferably includes a road wheel angle sensor, a current sensor, and a temperature sensor, which function to sense the angle of the first road wheel 22, the current draw of the first turning actuator 20, and the temperature of the first turning actuator 20, respectively. Similarly, the second turning sensor 30 preferably includes a current sensor, road wheel angle sensor, and a temperature sensor, which function to sense the angle of the second road wheel 28, the current draw of the second turning actuator 26, and the temperature of the second turning actuator 26, respectively. The road wheel angle, current draw, and the temperature are preferred measurements that indicate the force applied by the first turning actuator 20 or the second turning actuator 26 and feed back to the controller subsystem 18 to accomplish a predetermined adjustment of the turning angle of the first road wheel 22 or the second road wheel 28. In alternative embodiments, especially in the embodiments that do not include an electric motor as the first turning actuator 20 or the second turning actuator 26, the first turning sensor 24 and the second turning sensor 30 may include other suitable devices to measure the first turning factors or the second turning factors. The road wheel angle sensor, the current sensor, and the temperature sensor are preferably conventional sensors, but may alternatively be any suitable devices that sense first turning factors and second turning factors of the first turning actuator 20 and the second turning actuator 26.

The vehicle sensor 16 of the steer-by-wire system 10, which is preferably mounted at some location in the vehicle 32, preferably functions to sense vehicle factors of the vehicle 32. The vehicle sensor 16 preferably includes a vehicle speed sensor, a vehicle lateral acceleration sensor, and a vehicle yaw rate sensor, which preferably sense the vehicle speed, the vehicle lateral acceleration, and the vehicle yaw rate, respectively. The vehicle speed, vehicle lateral acceleration, and yaw rate are preferred measurements that indicate the current dynamic status of the vehicle 32. The vehicle sensor 16 may also include an ignition mode sensor that senses the ignition mode of the vehicle 32, and a vehicle roll sensor and a vehicle pitch sensor, which sense the vehicle roll and vehicle pitch of the vehicle 32, respectively. These vehicle factors collectively describe the current dynamic status of the vehicle 32. The sensors of the vehicle sensor 16 are preferably conventional sensors, but may alternatively be any suitable device that senses vehicle factors of the vehicle 32.

In the preferred embodiment of the invention, the steer-by-wire system 10 also includes a steering actuator 39 to generate a steering feedback to the driver 34. In one variation, the steering actuator 39 includes a conventional electric motor to generate the steering feedback, while in another variation, the steering actuator 39 includes a conventional magneto-rheological device ("MR device") to generate the steering feedback. Other suitable devices, however, may be used to generate a resistive force that produces a steering feedback to the driver 34. The steering actuator 39 is preferably coupled to the steering device 33 of the vehicle 32 and is preferably adapted to receive a steering feedback signal 40 (shown in FIG. 2) from the control subsystem, as discussed below.

The controller subsystem 18, which functions to control the turning angle of the first road wheel 22, the turning angle of the second road wheel 28, and the steering feedback of the steering actuator, is preferably connected to the steering sensor 12, the first turning sensor 24, the second turning sensor 30, and the vehicle sensor 16. In this manner, the controller subsystem 18 preferably produces the first turning control signal 36 for the first turning actuator 20 based on the steering factors, the first turning factors, and the vehicle factors. The controller subsystem 18 also preferably produces the second turning control signal 38 for the second turning actuator 26 based on the steering factors, the second turning factors, and the vehicle factors. The controller subsystem 18 further preferably produces the steering feedback signal 40 for the steering actuator 39 based on the steering factors, the first turning factors, and the second turning factors. The controller subsystem 18 may alternatively produce the first turning control signal 36, the second turning control signal 38, and the steering feedback system 40 based on additional factors.

During operation of the steer-by-wire system 10, the driver 34 of the vehicle 32 delivers a steering input to the steering device 33 of the vehicle 32. The steering sensor 12 senses steering factors of the steering input and, from these steering factors, the controller subsystem 18 determines the steering intent of the driver 34. Preferably simultaneously, the vehicle sensor 16 senses vehicle factors of the vehicle 32, the first turning sensor 24 senses first turning factors of the first turning actuator 20, and the second turning sensor 30 senses second turning factors of the second turning actuator 26. From these vehicle factors, first turning factors, and second turning factors, the controller subsystem 18 determines the current dynamic status of the vehicle 32. Then the controller subsystem 18 compares the steering intent with the current dynamic status and, from this comparison, the controller subsystem 18 produces an appropriate first turning control signal 36, a second turning control signal 38, and a steering feedback signal 40. The first turning control signal 36 and the second turning control signal 38 are preferably independent of each other. In other words, the controller subsystem 18 may control the first turning actuator 20 to adjust the turning angle of the first road wheel 22 and, independently, control the second turning actuator 26 to adjust the turning angle of the second road wheel 28. In this manner, the turning angle of the first road wheel 22 and the turning angle of the second road wheel 28 may be optimized to match the steering intent of the driver 34 with the current dynamic status of the vehicle 32.

As the above description suggests, the terms "steering sensor", "turning sensor", and "vehicle sensor" may include components one or more in number, local or remote to the vehicle 32, specialized or shared in their functionality.

As any person skilled in the art of steer-by-wire systems will recognize from the previous detailed description and from the figures and claims, modifications and changes can be made to the preferred embodiment of the invention without departing from the scope of this invention defined in the following claims.

We claim:

1. A steer-by-wire system for a vehicle having a first front wheel capable of turning, a second front wheel capable of turning, and a steering device capable of receiving a steering input from a driver of the vehicle, comprising:

a steering sensor coupled to the steering device and adapted to sense steering factors of the steering input;

a turning subsystem including a first turning actuator coupled to the first front wheel and adapted to receive a first turning control signal and to adjust a turning angle of the first front wheel, a first turning sensor coupled to said first turning actuator and adapted to sense first turning factors of said first turning actuator, a second turning actuator coupled to the second front wheel and adapted to receive a second turning control signal end to adjust a turning angle of the second front wheel, and a second turning sensor coupled to said second turning actuator and adapted to sense second turning factors of said second turning actuator, said turning first factors include a current draw of said first actuator and a temperature of said first actuator, said second turning factors include a current draw of said second turning actuator and a temperature of said second turning actuator;

a vehicle sensor coupled to the vehicle and adapted to sense vehicle factors of the vehicle; and a controller subsystem connected to said steering sensor, to said first turning sensor, to said second turning sensor, and to said vehicle sensor, and adapted to produce the first turning signal based on the steering factors, the first turning factors, and the vehicle factors thereby controlling the turning angle of the first front wheel and to produce the second turning signal based on the steering factors, the second turning factors, and the vehicle factors thereby independently controlling the turning angle of the second front wheel.

2. A steer-by-wire system for a vehicle of claim 1, further comprising a steering actuator coupled to the steering device and adapted to receive a steering feedback signal and to generate a steering feedback to the driver, wherein said controller subsystem is further adapted to produce the steering feedback signal based on the steering factors, the first turning factors and the second turning factors thereby controlling the steering feedback of the steering device.

3. A steer-by-wire system for a vehicle of claim 2, wherein said steering actuator includes an electric motor to generate the steering feedback.

4. A steer-by-wire system for a vehicle of claim 2, wherein said steering actuator includes a magneto-rheological device to generate the steering feedback.

5. A steer-by-wire system for a vehicle of claim 1, wherein steering factors include steering angle and steering torque.

6. A steer-by-wire system for a vehicle of claim 1, wherein said vehicle factors include vehicle speed, vehicle lateral acceleration and vehicle yaw rate.

7. A steer-by-wire system for a vehicle of claim 6, wherein said vehicle factors also include ignition mode.

8. A steer-by-wire system for a vehicle of claim 7, wherein said vehicle factors also include vehicle roll and vehicle pitch.

9. In a steer-by-wire system for a vehicle having a first front wheel capable of turning, a first turning actuator capable of adjusting the turning angle of the first front wheel, a second front wheel capable of turning, a second turning actuator capable of adjusting the turning angle of the second front wheel, and a steering device capable of receiving a steering input from a driver of a vehicle, a method of controlling the first front wheel and the second front wheel comprising:

sensing steering factors of the steering input and determining the steering intent of the driver;

sensing vehicle factors of the vehicle, sensing first turning factors of the first turning actuator, sensing second turning factors of the second turning actuator;

determining a current dynamic status of the vehicle, said sensing first turning factors includes sensing a current draw of the first turning actuator and sensing a temperature of the first turning actuator, said second turning factors include sensing a current draw of the second turning actuator and sensing a temperature of the second turning actuator;

comparing the steering intent and the current dynamic status;

producing a first turning control signal for the first turning actuator based on the steering factors, the vehicle factors, and the first turning factors to control the turning angle of the first front wheel; and producing a second turning control signal for the second turning actuator based on the steering factors, the vehicle factors, and the second turning factors to independently control the turning angle of the second front wheel.

10. In a steer-by-wire system for a vehicle of claim 9, wherein said sensing steering factors includes sensing steering angle and steering torque.

11. In a steer-by-wire system for a vehicle of claim 9, wherein said sensing vehicle factors include sensing vehicle speed, vehicle lateral acceleration, and vehicle yaw rate.

12. In a steer-by-wire system for a vehicle of claim 11, wherein said sensing vehicle factors further includes sensing ignition mode.

13. In a steer-by-wire system for a vehicle of claim 11, wherein said sensing vehicle factors further includes sensing vehicle roll and vehicle pitch.

* * * * *